(12) United States Patent
Atin et al.

(10) Patent No.: US 10,537,940 B2
(45) Date of Patent: Jan. 21, 2020

(54) SCANNING BEVELS IN PREPARATION FOR WELDING (71) Applicant: Acergy France SAS, Suresnes (FR)

(72) Inventors: Cesar Atin, Nanterre (FR); Jaques Lacome, Sucy en Brie (FR)

(73) Assignee: Acergy France SAS, Suresnes (FR)

( * ) Notice: Subject to any disclaimer, the term of this patent is extended or adjusted under 35 U.S.C. 154(b) by 66 days.

(21) Appl. No.: 15/544,252

(22) PCT Filed: Jan. 14, 2016

(86) PCT No.: PCT/IB2016/000098
§ 371 (c)(1),
(2) Date: Jul. 17, 2017

(87) PCT Pub. No.: WO2016/116812
PCT Pub. Date: Jul. 28, 2016

(65) Prior Publication Data
US 2018/0001389 A1    Jan. 4, 2018

(30) Foreign Application Priority Data
Jan. 21, 2015  (GB) .................................. 1500988.9

(51) Int. Cl.
B23B 5/16      (2006.01)
B23C 3/12      (2006.01)
B23K 28/02     (2014.01)
B23Q 17/20     (2006.01)
B23Q 17/22     (2006.01)
(Continued)

(52) U.S. Cl.
CPC ................ *B23B 5/162* (2013.01); *B23C 3/12* (2013.01); *B23K 28/02* (2013.01); *B23Q 17/20* (2013.01); *B23Q 17/2266* (2013.01); *B23Q 17/2428* (2013.01); *B24B 9/007* (2013.01); *G01B 11/2518* (2013.01); *B23B 5/163* (2013.01);
(Continued)

(58) Field of Classification Search
CPC ...... B23Q 17/20; B23Q 17/24; B23Q 17/226; B23Q 17/2471; B23C 3/12; B24B 9/007; B24B 49/12
See application file for complete search history.

(56) References Cited

U.S. PATENT DOCUMENTS 4,213,555 A      7/1980  Minkiewicz
4,221,514 A *    9/1980  Pavlovsky ................ B23C 3/12
                                                    409/291
(Continued)

FOREIGN PATENT DOCUMENTS

DE    200 00 092    3/2000
EP    1 815 938     8/2007
(Continued)

*Primary Examiner* — Willmon Fridie, Jr.
(74) *Attorney, Agent, or Firm* — Levy & Grandinetti (57) ABSTRACT A method measures an edge of a workpiece by scanning. The scanning is performed by a scanning tool mounted on a moving head of an edge-facing machine while that moving head is moved along the edge to be measured before, during or after an edge facing tool of the edge-facing machine that faces the edge. The method can be performed by an edge-facing machine that includes at least one edge facing tool and that further includes a scanning tool mounted on a movable head of the machine, which head is movable along an edge of a workpiece.

21 Claims, 4 Drawing Sheets (51) Int. Cl.
   *B23Q 17/24* (2006.01)
   *B24B 9/00* (2006.01)
   *G01B 11/25* (2006.01)
   *B23K 26/57* (2014.01)
   *B23K 37/02* (2006.01)
   *B24B 49/12* (2006.01)

(52) U.S. Cl.
   CPC .......... *B23K 26/57* (2015.10); *B23K 37/0252* (2013.01); *B24B 49/12* (2013.01)

(56) References Cited

U.S. PATENT DOCUMENTS

| | | | | |
|---|---|---|---|---|
| 4,324,049 A * | 4/1982 | Blose | ........................ | G01B 7/28 33/199 B |
| 4,517,867 A * | 5/1985 | Fuminier | ................ | B23D 21/00 30/94 |
| 4,594,873 A | 6/1986 | Kaunitz | | |
| 4,774,753 A * | 10/1988 | Holy | ........................ | B23Q 17/20 33/504 |
| 5,778,744 A * | 7/1998 | Braun | ...................... | B23B 5/163 408/2 |
| 6,129,488 A | 10/2000 | Fahr | | |
| 6,526,670 B1 * | 3/2003 | Carli | ...................... | B23Q 17/20 33/503 |
| 8,601,917 B2 * | 12/2013 | Schreiber | ................ | B23B 25/06 33/555.1 |
| 2009/0116914 A1 | 5/2009 | Rieth et al. | | |
| 2011/0079584 A1 * | 4/2011 | Hees | ........................ | E21B 19/16 219/61 |
| 2011/0087457 A1 * | 4/2011 | Petrescu | .................. | B24B 49/12 702/167 |
| 2011/0155711 A1 | 6/2011 | Doyle et al. | | |
| 2011/0251714 A1 * | 10/2011 | Nishikawa | ............ | B23Q 17/20 700/174 |
| 2011/0307212 A1 * | 12/2011 | Nishikawa | ........... | G01B 21/042 702/152 |

FOREIGN PATENT DOCUMENTS

| | | |
|---|---|---|
| GB | 471547 | 9/1937 |
| JP | 2003-211315 | 7/2003 |

* cited by examiner

SCANNING BEVELS IN PREPARATION FOR WELDING

This invention relates to methods and apparatus for scanning bevels of workpieces during preparation for welding, for example when fabricating pipelines from pipe joints.

Before welding together two workpieces, for example abutting lengths of steel pipe, the weld region has to be prepared by removing some metal. Preparation for welding commonly involves bevelling an abutting edge of one or both of the workpieces, which facilitates subsequent butt welding of the workpieces along the bevelled edge or edges.

Bevelling forms an angle between an edge of a workpiece and a plane perpendicular to a surface of the workpiece. Typical bevel angles are between 20 and 40 degrees, by way of example. Conventionally, the workpiece is held on a table or between jaws when bevelling. A bevelling machine, which may be controlled manually or by a program, cuts or grinds the appropriate edge to the desired shape and angle. Alternatively, GB 471547 describes shaping edges of steel plates by flame machining.

A bevel may be cut at a uniform angle straight through the thickness of the workpiece, hence terminating in a feathered edge. However, a bevel is commonly shaped to define a compound angle, a double bevel from both sides and/or a root face. For example, a 'J-bevel' section has a straight or curved major portion defining an angled groove face and a radiused transition into a root face defined by a protruding land. Some examples of bevel shapes are shown in U.S. Pat. No. 4,213,555.

Bevelling is prevalent in industries such as oil and gas, shipbuilding and construction when fabricating heavy-duty structures of steel. The invention is particularly apt to be used when fabricating subsea pipelines used in the offshore oil and gas industry, which application will be used to describe the invention in the examples that follow.

Rigid subsea pipelines are commonly fabricated from lengths of steel pipe—'pipe joints'—that are welded together automatically end-to-end. Pipe joints are typically about 12 m in length but may be manufactured in multiples of that length, such as double, triple or quad pipe joints.

In many cases, pipe joints are welded together offshore along a firing line aboard an installation vessel as a pipeline is laid, typically by S-lay or J-lay methods. It is also common to fabricate pipe stalks from pipe joints onshore along a firing line at a coastal spoolbase or yard and then to weld together the pipe stalks end-to-end to spool a prefabricated pipeline onto a reel. The spooled pipeline is then transported offshore for laying in a reel-lay operation.

The ends of a pipe joint may be bevelled in the factory or, preferably, just before being welded to other components of a pipeline during fabrication. Even if bevelled in the factory, the ends of a pipe joint will typically need to be dressed or faced just before being incorporated into a pipeline. This is because the ends of pipe joints may have suffered corrosion, damage or distortion during handling, storage and transportation in their long journey from the factory to the fabrication site, in addition to normal within-tolerance variations of manufacture. In this respect, a storage and transportation period of several months and a journey of thousands of kilometres may lie between manufacturing pipe joints in the factory and fabricating a pipeline from those pipe joints.

When fabricating subsea pipelines and other structures, welds must be made as quickly as is consistent with high quality. Quality of welding is paramount because failure of a subsea pipeline during installation or during several years of service is unacceptable. Satisfactory weld quality requires effective preparation of the pipe joints for welding, including correct bevelling.

Whilst secondary to quality, speed of welding is also important because the speed of spooling and/or pipelaying depends upon minimising the timescale of all operations on the critical path. In this respect, welding includes preparation for welding, which in turn includes dressing or bevelling the pipe ends and then inspecting and possibly remedying or re-bevelling the pipe ends.

Delays in fabricating a pipeline may tie up a valuable capital asset in the form of an installation vessel that could be worth hundreds of millions of US dollars. Delays also increase operational costs of the vessel that may accumulate at a rate of hundreds of thousands of US dollars per day. Delays also risk missing a weather window during which the pipeline can be laid in a satisfactory sea state, which could delay the entire subsea installation project at even greater expense.

Dressing, facing or bevelling of a pipe joint is typically performed by a pipe facing machine that can machine an end of the pipe joint in one continuous pass. For this purpose, a facing head comprises a cutting tool or a grinder mounted on a rotating arm or on a rotating plate connected to the end of the pipe joint. For example, JP 2003-211315 discloses a pipe edge cutter that rolls around a pipe, DE 20000092 discloses another rotating bevelling machine, and US 2009/116914 discloses a high-speed pipe facing machine comprising rotating cutters.

For ease of understanding, FIGS. 1a to 1d of the accompanying drawings represent the main features of a pipe facing machine. The exemplary machine shown schematically in these drawings is simplified and is not to scale.

The pipe facing machine 10 shown in FIGS. 1a to 1d is an 'ID mount' machine, so called because it is anchored to the internal diameter of a pipe joint 12. An ID mount arrangement is suitable for larger pipes. It is possible instead to anchor another type of pipe facing machine to the external diameter of a pipe, which is more suitable for smaller pipes.

The pipe joint 12 shown in FIGS. 1a to 1d is held horizontally by a clamp 14 at a convenient working height above a floor 16, such as a working deck of a pipelaying vessel. As is conventional, the pipe joint 12 shown here has been pre-coated during manufacture with a protective and thermally-insulating parent coating 18, most commonly of polypropylene, that is cut back with a chamfered edge to expose the pipe end 20. This coating 18 mitigates external corrosion of the pipeline and insulates the fluids that the pipeline carries in use.

To mitigate internal corrosion of the pipeline, pipe joints may also be lined upon manufacture with a liner sleeve, for example of a corrosion-resistant alloy or of a plastics material. However, a liner sleeve has been omitted from the pipe joint 12 of FIGS. 1a to 1d for simplicity.

When one pipe joint 12 has been welded to an adjoining pipe joint 12 during fabrication of a pipeline, a field joint coating is applied to extend between opposed chamfers of their parent coatings 18. Thus, the field joint coating covers the weld region and the exposed abutting pipe ends 20. Our earlier patent application published as WO 2012/004665 describes how field joint coatings may be applied after pipe joints are welded together.

The pipe facing machine 10 shown in FIGS. 1a to 1d comprises a frame 22 that conveniently stands on a trolley 24 whereby the machine 10 can be manoeuvred across the floor 16 for use. The frame 22 supports a cantilevered fixed rigid horizontal shaft 26 at such a height above the floor 16 that the shaft 26 and the pipe joint 12 can share a common central longitudinal axis 28 when aligned.

Figure 1A:
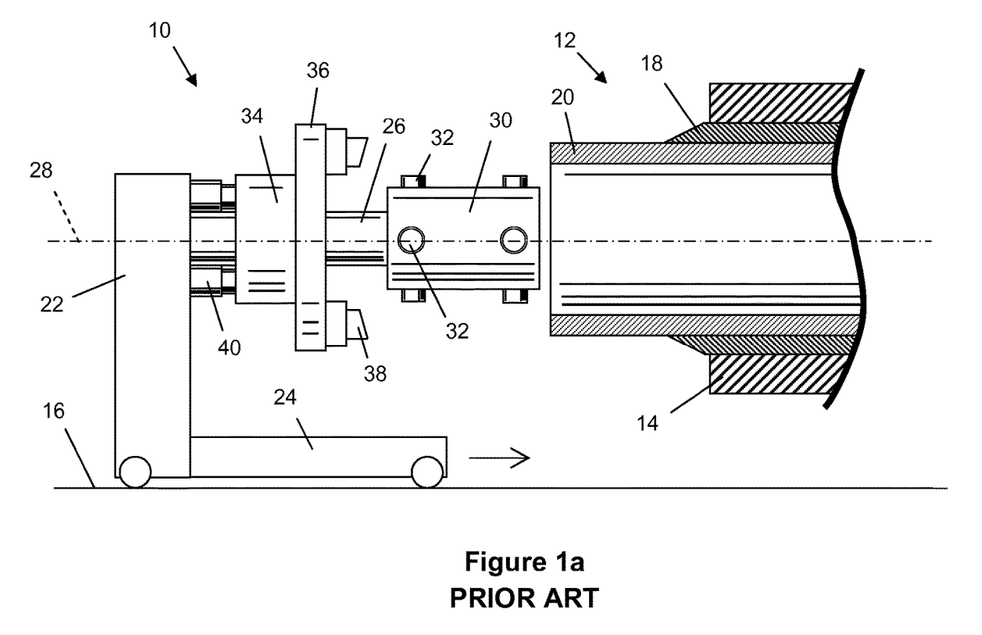
Figure 1B:
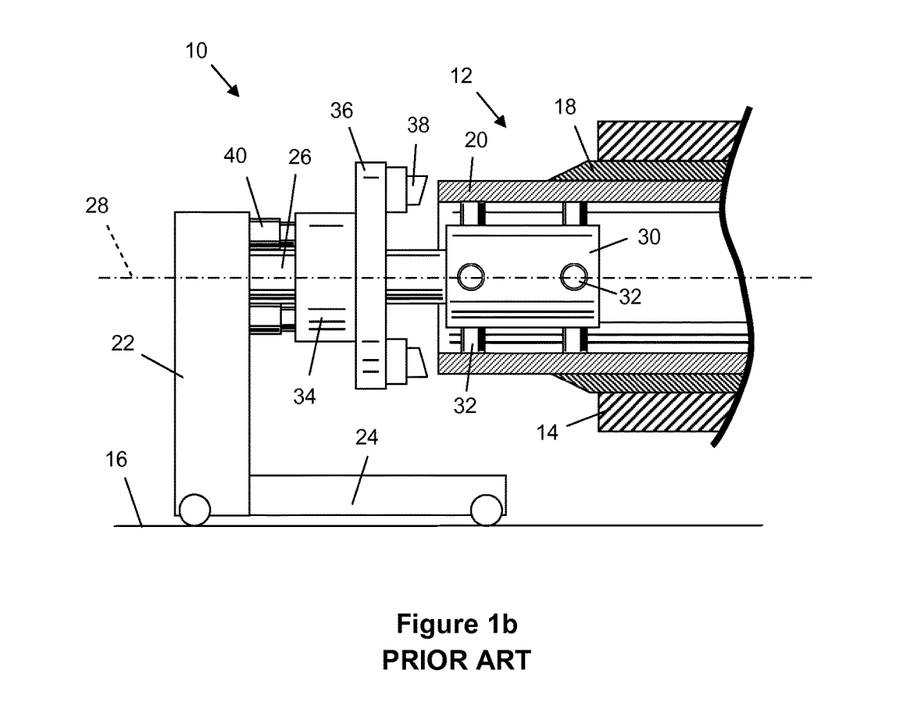
Figure 1C:
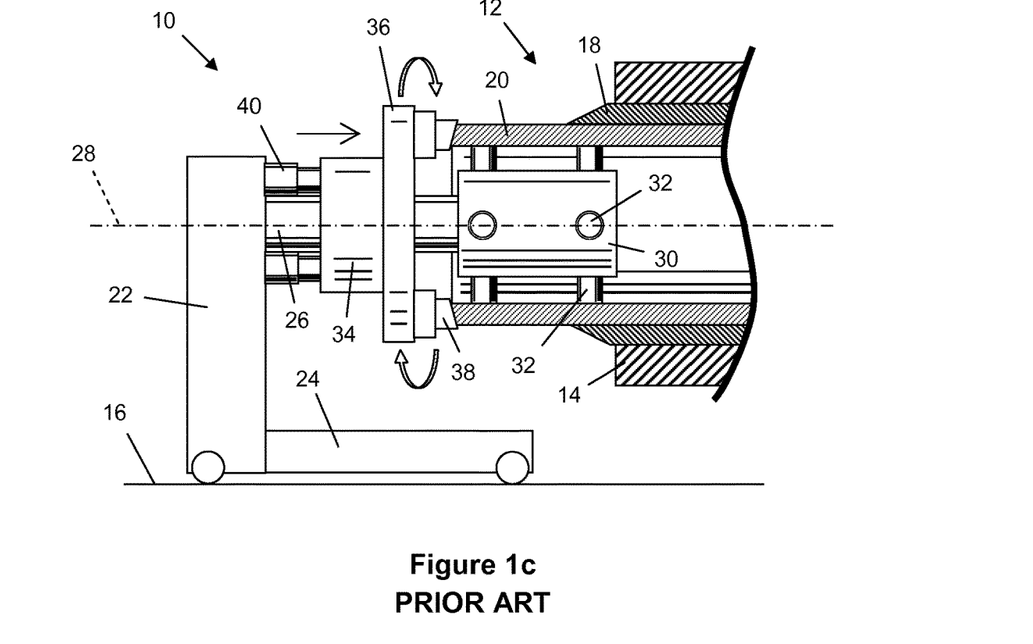
Figure 1D:
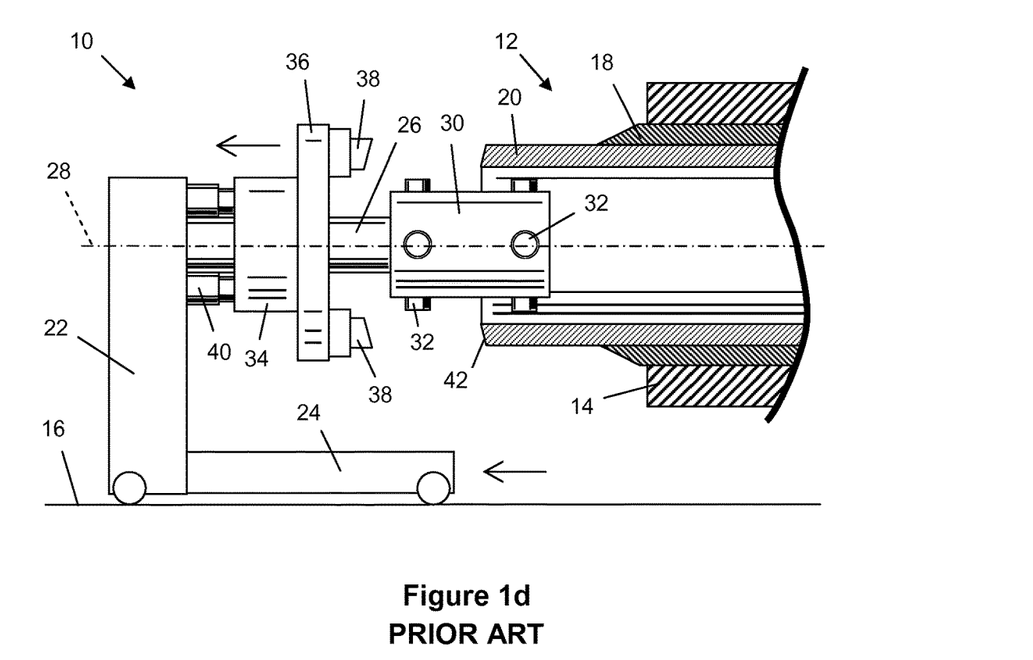

A mounting head 30 at the free distal end of the shaft 26 comprises pads 32 or shoes that can be advanced radially with respect to the central longitudinal axis 28 from a retracted position shown in FIGS. 1*a* and 1*d* to an extended position shown in FIGS. 1*b* and 1*c*.

A motor 34 fixed to the shaft 26 at a proximal position with respect to the mounting head 30 drives a facing or cutting head 36 for rotation around the shaft 26. The facing head 36 is a rotatable disc-shaped plate extending generally orthogonally from the central longitudinal axis 28, fitted with angularly-spaced facing tools 38 that are positioned at the same distance from the central longitudinal axis 28 as the radius of the pipe joint 12. Thus, the facing tools 38 follow the circumference of the end 20 of the pipe joint 12 as the facing head 36 turns about the shaft 26, which is also centred on the central longitudinal axis 28. The facing tools 38 are adapted for cutting or grinding the end 20 of the pipe joint 12.

Longitudinal double-acting actuators 40 between the motor 34 and the frame 22 are arranged to advance and retract the motor 34 and the facing head 36 axially in distal and proximal directions along the shaft 26. When advanced, the motor 34 and the facing head 36 move distally toward the mounting head 30; conversely, when retracted, the motor 34 and the facing head 36 move proximally away from the mounting head 30. The distally-advanced position of the motor 34 and the facing head 36 is shown in FIG. 1*c*. The proximally-retracted position of the motor 34 and the facing head 36 is shown in FIGS. 1*a*, 1*b* and 1*d*.

As illustrated, the actuators 40 are positioned proximally of the facing head 36 and hence act in compression to push the facing head 36 distally, which pushes the facing tools 38 against the end 20 of the pipe joint 12. Actuators could instead be positioned distally of the facing head 36, acting in tension between the facing head 36 and the mounting head 30 to pull the facing head 36 distally, which would instead pull the facing tools 38 against the end 20 of the pipe joint 12.

When the pads 32 are retracted as shown in FIG. 1*a*, the mounting head 30 can be inserted into the open end 20 of the pipe joint 12 as the frame 22 is wheeled across the floor 16 on the trolley 24. When the mounting head 30 has been inserted fully into the pipe joint 12 as shown in FIG. 1*b*, the pads 32 are extended to press against the internal surface of the pipe joint 12. This locks the mounting head 30 relative to the pipe joint 12 to anchor the pipe facing machine 10 in fixed relation to the pipe joint 12, in a facing-ready or cutting-ready position.

Next, the facing head 36 is turned by the motor 34 and the longitudinal actuators 40 are extended to advance the motor 34 and the rotating facing head 36 distally along the shaft 26 toward the mounting head 30. This brings the circumferentially-moving facing tools 38 into contact with the end 20 of the pipe joint 12 as shown in FIG. 1*c*. The moving facing tools 38 are shaped to impart the desired shape of bevel 42 to the end 20 of the pipe joint 12, which in this simplified example is cut at a uniform angle straight through the thickness of the pipe wall.

The simple bevel 42 at the end 20 of the pipe joint 12 is evident in FIG. 1*d*, in which the pads 30 have been retracted back into the mounting head 30 to disengage the pipe facing machine 10 from the pipe joint 12. Also, the motor 34 and the facing head 36 have been retracted proximally and the frame 22 has been wheeled back on its trolley 24 to begin withdrawing the mounting head 30 from within the pipe joint 12.

After machining and finishing in this manner, the bevelled end of a pipe joint is inspected visually and measured. Accurate measurement of a pipe joint is essential at each end region because the ends must interface correctly with adjoining pipe joints of the pipeline via circumferential girth welds. Desirable measurements include internal and external diameter; wall thickness; out-of-roundness or 'ovalisation'; planarity of the pipe end; and orthogonality of the pipe end plane with respect to the longitudinal axis of the pipe.

It is particularly important to check that the bevel dimensions are in accordance with specifications and within tolerance. If not, grinding or skimming can repair minor damage but an entirely new bevel may need to be cut if damage is more extensive or if the bevel is otherwise too far outside specifications.

Some but not all of the desired parameters of a bevelled pipe joint can be measured manually, for example by measuring key points with a calliper instrument. Manual measurement is slow and prone to errors. In this respect, it should be noted that bevelled pipe joints used in the offshore oil and gas industry have to be measured in challenging conditions wherever the pipe joints are about to be welded together, for example on a pipelay vessel at sea or at a coastal yard or spoolbase. Also, instruments for manual measurement are not optimally accurate for the purpose of high-quality automatic welding. A particular drawback of manual measurement is that it is not able to detect certain bevel defects, for example if the end of the pipe is out of plane or out of roundness: the assumedly circular shape of the bevel may not represent reality.

The drawbacks of manual measurement mean that scanning techniques are preferred to measure the bevelled end of a pipe joint. Where the workpiece is a pipe joint, either the pipe joint turns inside a frame that supports a measuring device, or a measuring bug or probe turns with respect to a fixed pipe joint. The latter option is more practical for large pipe joints.

In a specific scanning arrangement for pipe joints, a bevel measuring device comprises a measuring head such as a laser bug that runs on a ring clamped near the end of a pipe joint. The ring may be clamped around the exterior of the pipe joint or may be clamped internally within the pipe joint, for example with an ID-mount arrangement like that described for the pipe facing machine shown in FIGS. 1*a* to 1*d*. When the bevel measuring device is clamped to the pipe joint, the measuring head is driven around the pipe end using a stepper motor. As the bevel is scanned by the measuring head, dimensional information regarding the bevel is recorded for later analysis and may also be displayed graphically and numerically in real time.

It will be apparent that bevel dimensions are checked only after totally de-rigging the pipe facing machine from the pipe joint and then rigging the bevel measuring device. If the bevel is not fit-for-purpose, the bevel measuring device has to be de-rigged so that the pipe facing machine can be re-rigged, followed by a re-bevelling operation, a further de-rig of the pipe facing machine and finally re-measurement of bevel dimensions after re-rigging the bevel measuring device. This whole process cycle wastes a great deal of time and increases the risk of problems, even if re-bevelling can be kept off the critical path so as to cause no loss in production.

Of course, once in the firing line in offshore and spoolbase applications, non-specification bevels that are discovered just before root pass welding can have a dramatic effect on the rate of pipeline production because the pipe then has to be re-bevelled in the critical path. Also, if root pass defects result from non-specification bevels, the resulting repairs to the weld in the critical path can have an even more dramatic effect on production.

For example, in US 2011/155711 a scanning device is mounted on a welding head and scans a groove formed between abutting bevels of workpieces to be welded together. The groove is scanned just before welding in order to adjust the welding parameters to suit the groove dimensions. However, detecting and remedying edge defects at such a late stage will cause severe delays on the critical path and may even require a section of the pipeline to be cut out.

In an entirely different approach to solve this problem, U.S. Pat. No. 4,594,873 proposes inserting an apparatus that expands a pipe end radially before bevelling to correct defects of the pipe itself. This aims to ensure that bevels will always have a perfectly circular shape, correctly orthogonal to the longitudinal axis of the pipe. However, as the plastic limit of the steel is exceeded during expansion, this is not acceptable for pipes used in high-pressure oil transport because the pipe end region may be too brittle. Similarly, U.S. Pat. No. 6,129,488 describes a pipe facing machine in which a cutting tool is pressed against the end of a pipe so that the bevel has a regular shape even if the underlying pipe end has defects. However, in both cases, there remains a need to verify the bevel dimensions and to detect any edge defects after machining. Also, there remains a risk that small but still significant geometrical defects of the bevel may not be detected before welding, when it is too late easily to correct them.

U.S. Pat. No. 5,778,744 discloses another approach, in which separate dedicated assemblies are used to provide clamping and machining functions with integrated sensing for certain pipe parameters. A clamping device holds a pipe between piston-actuated jaws, the piston being fitted with a travel pick-up that provides a measurement of the outer diameter of the pipe. The apparatus further includes a chamfering tool carried on a tool holder that in turn is supported by a rotatable facing head. The facing head also supports a sensor that sits diametrically opposite the chamfering tool and is configured to rotate with the facing head inside a pipe to measure the internal diameter of the pipe.

In U.S. Pat. No. 5,778,744, the sensor scans the internal (and/or the external) surface of the pipe, and so only provides measurements of the internal (and/or the external) diameter of the pipe and optionally the profile of the surface. So, the equipment described in U.S. Pat. No. 5,778,744 cannot be used to measure the edge of the pipe that is to be faced, or the resulting chamfer. Manual measurements of the finished chamfer will therefore still be required to ensure that, for example, the chamfer is at the correct angle and that the pipe end is free from out-of-plane or out-of-roundness defects.

So, the background to the present invention is that known pipe facing machines do not have the capability to determine or to control the bevel quality, dimensionally or otherwise. Such machines can only machine the pipe to create the bevel. They cannot automatically adjust bevel edge geometry during facing. Even merely determining that the dimensions of the bevel are correct and within tolerance is a separate and time-consuming operation that can only be performed after the pipe facing machine has been de-rigged and a pipe measuring device has been rigged in its place. Correcting a faulty bevel or, if necessary, cutting an entirely new bevel after measurement involves de-rigging the pipe measuring device and re-rigging the pipe facing machine. This is needlessly complex and even more time-consuming. If measurement of a bevel is left until just before welding, severe delays on the critical path will impact production.

Against that background, the invention resides in a method of facing an edge of a workpiece to prepare that edge for welding, the method comprising scanning the edge with at least one scanning tool mounted on a moving head of an edge-facing machine while that moving head is moved along said edge, and cutting or grinding the edge using an edge-facing tool of the edge-facing machine to face said edge. Elegantly, at least one edge-facing tool may also be mounted on said moving head of the edge-facing machine. The method may comprise scanning the edge with the at least one scanning tool before, while or after an edge-facing tool of the edge-facing machine cuts or grinds the edge, for example.

The edge-facing machine is preferably fixed in a facing-ready position relative to the workpiece. Then, while the edge-facing machine is in the facing-ready position, the or each scanning tool may be moved along said edge of the workpiece to measure said edge.

The or each edge-facing tool may be advanced into engagement with said edge of the workpiece. Then, the or each edge-facing tool may be moved along said edge of the workpiece to face said edge. These operations may happen after measuring said edge and while the edge-facing machine remains in the facing-ready position, or before measuring said edge but while the edge-facing machine is in the facing-ready position. In the latter case, the or each edge-facing tool of the edge-facing machine is suitably retracted out of engagement with said edge before measuring said edge. It is also possible to measure said edge of the workpiece while moving the or each edge-facing tool along that edge to face that edge.

In any event, the or each scanning tool may be moved along said edge of the workpiece to measure said edge, after facing said edge and while the edge-facing machine remains in the facing-ready position.

Preferably, facing of said edge of the workpiece is controlled in accordance with measurements of said edge taken by the or each scanning tool. Advantageously, edge measurement data is communicated wirelessly from the or each scanning tool to a data store and/or to a data processor that may be linked with the data store.

The position of the or each scanning tool relative to said edge of the workpiece may be tracked during scanning, for example by an encoding wheel positioned to engage the workpiece during scanning to track the position of a scanning tool relative to said edge of the workpiece during scanning. In that case, the or each scanning tool is suitably biased into tracking contact with the workpiece.

The method of the invention is particularly apt to be performed on a circumferential edge of a tubular workpiece. In that case, the or each scanning tool is suitably moved circumferentially relative to the tubular workpiece on a rotary moving head of the machine. Also, a mounting head of the edge-facing machine may cooperate with the tubular workpiece to anchor the machine relative to the workpiece by radial movement of at least one clamping element relative to the axis of rotation of the rotary head.

The inventive concept extends to an edge-facing machine comprising at least one edge-facing tool configured to cut or grind an edge of a workpiece to face said edge, and further comprising at least one scanning tool mounted on a movable head of the machine, which head is movable relative to a support frame of the edge-facing machine along the edge of the workpiece.

Preferably, at least one edge-facing tool is mounted on the movable head adjacent to the or each scanning tool. For example, the or each scanning tool and the or each edge-facing tool may be positioned on a distal side of the movable head and the or each scanning tool may be oriented to emit an edge-scanning beam distally. The or each scanning tool is conveniently positioned between two or more edge-facing tools on the movable head. A movable or removable mounting is preferably provided for the or each scanning tool on the movable head.

Broadly, therefore, the invention provides a method to control a facing machine such as a bevelling machine for bevelling an edge of a steel item such as a pipe before welding, which method involves mounting an optical scanning system on a moving part of the facing machine and using that scanning system to scan the edge of the steel item before, during and/or after bevelling the edge.

The position and/or angle of a cutter or grinder of the facing machine may be adjusted as a function of the actual dimensions of the scanned edge versus the desired dimensions of a target bevel. Scanning and adjustment steps may be repeated as the moving part of the facing machine is displaced along the edge of the steel item.

The invention also provides a scanning device for mounting on a facing machine and controlling the geometry of an edge of a steel item before and/or after bevelling, the scanning device comprising: a mounting interface for attaching the scanning device to a moving part of the facing machine; and a scanning system fixedly attached to the mounting interface.

A mounting angle of the scanning system may be modified or adjusted so that the scanning device can optimally scan the width of the edge.

A second optical scan system may be mounted on the moving part of the facing machine. The second optical scan system may be oriented to scan the edge of the steel item after bevelling.

The invention preferably controls bevel machining by means of an optical scanning system such as a laser scanning system. At least one laser source and at least sensor for reflected light such as a CCD (charge coupled device) sensor or a CMOS (complementary metal oxide semiconductor) sensor are mounted on the facing or cutting head or probe of a pipe facing machine. The scanning system may also comprise at least one encoder wheel positioned to be pressed against a wall of the steel item, inboard of the edge being bevelled.

It is possible for the same scanning system, or another scanning system, also to inspect the finished bevel so that the optimum welding configuration can be implemented. This may involve matching of pipe joint ends and/or calculating and adjusting welding parameters. For example, the actual shape of the bevelled edge may be recorded and stored in a data storage system for use in modelling a welding groove between abutting bevelled items before welding takes place.

Reference has already been made to FIGS. 1a to 1d of the accompanying drawings, which are a sequence of schematic part-sectioned side views of a prior art pipe facing machine at various stages of operation when applying a bevel to a pipe end. In order that the invention may be more readily understood, reference will now be made, by way of example, to the remainder of the accompanying drawings in which.

Figure 2:
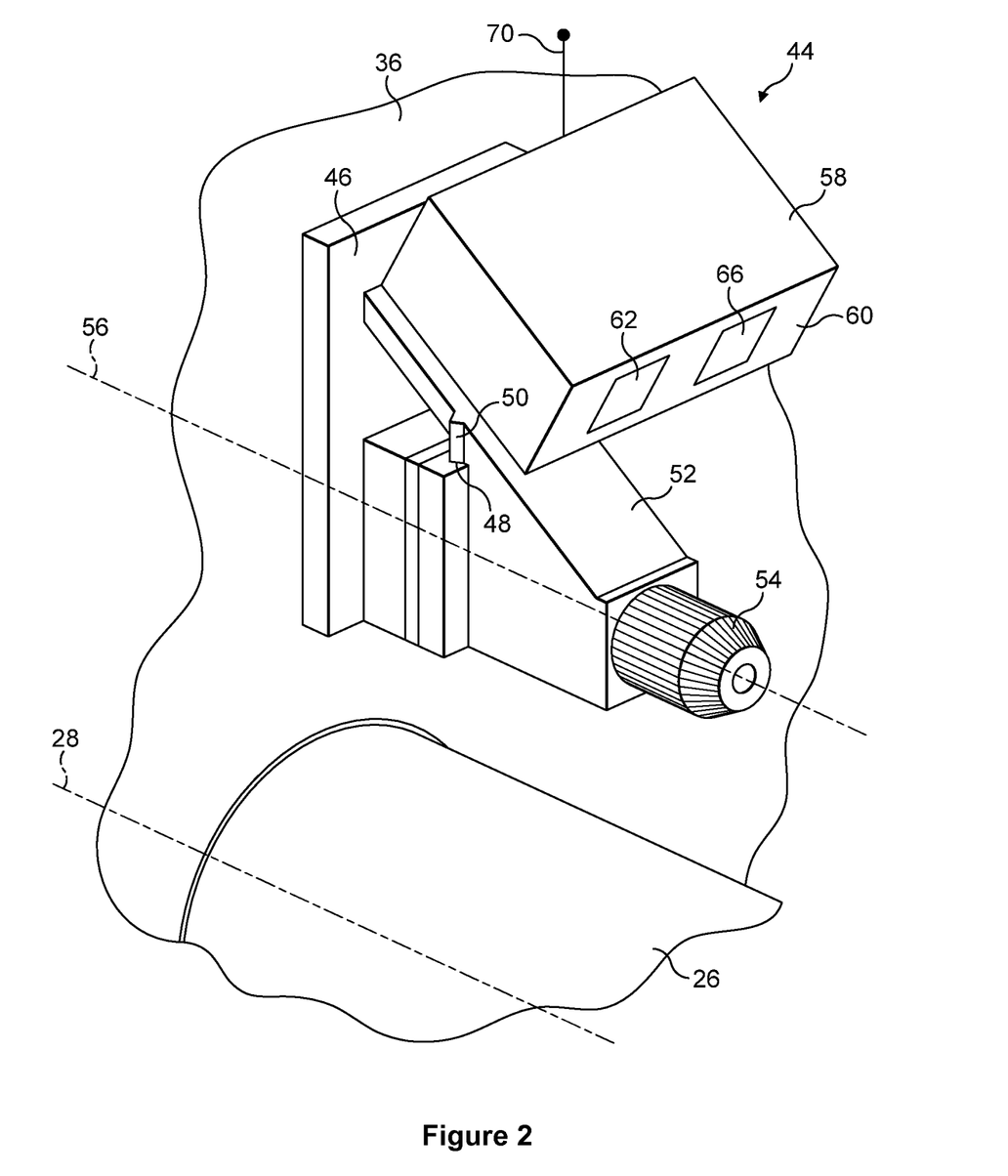
FIG. 2 is a schematic perspective view of a scanning tool in accordance with the invention, mounted on a rotatable facing head of a pipe facing machine.
Figure 3:
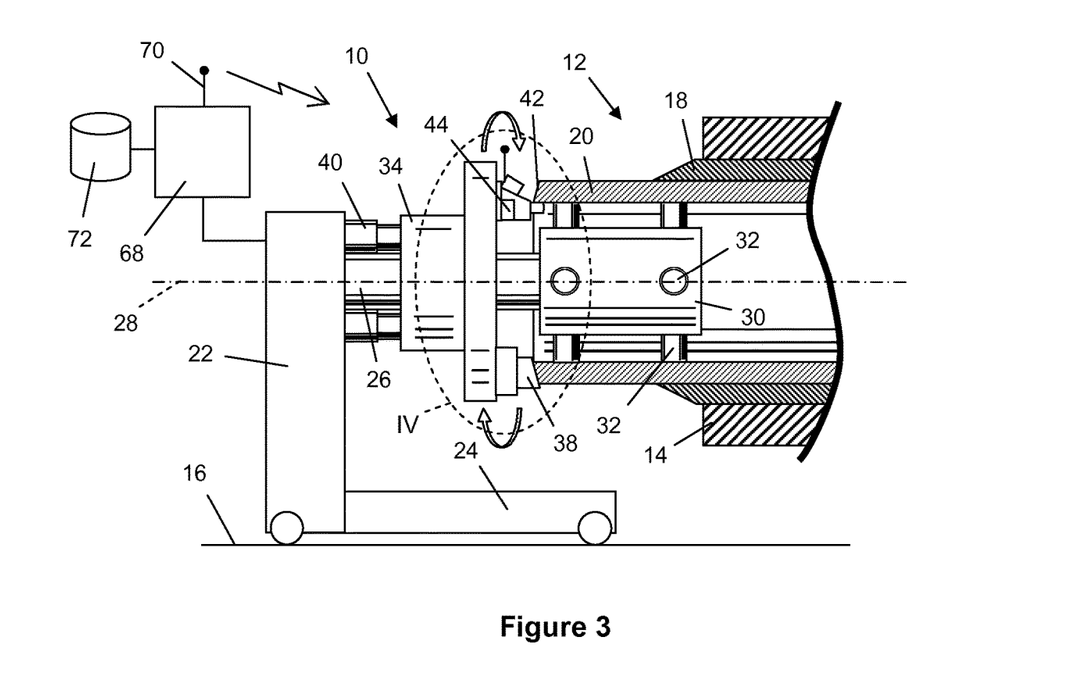
FIG. 3 is a schematic part-sectioned side view of a pipe facing machine fitted with the scanning tool of FIG. 2.
Figure 4:
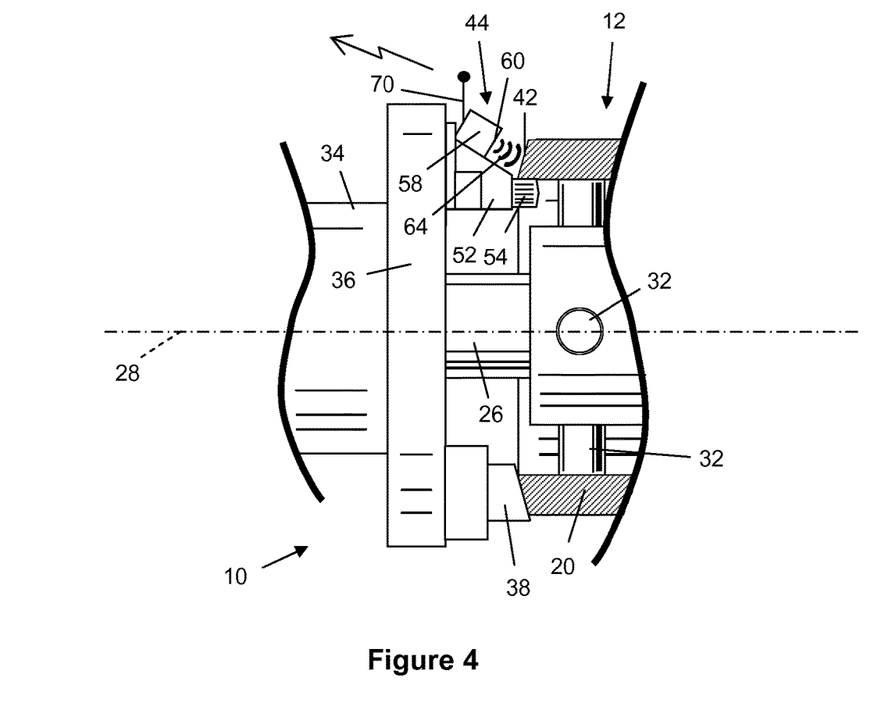
FIG. 4 is an enlarged view of Detail IV shown in FIG. 3.

Like numerals are used for like parts in FIGS. 2 to 4. In those figures, a scanning tool 44 in accordance with the invention is shown fitted to the facing head 36 of a pipe facing machine 10 like that shown in FIGS. 1a to 1d. The scanning tool 44 is on the same side of the facing head 36 as the facing tools 38, hence facing the mounting head 30 so as to face toward the end 20 of the pipe joint 12 in use. The scanning tool 44 is suitably disposed in a gap between the angularly-spaced facing tools 38, on a similar radius from the central longitudinal axis 28.

The scanning tool 44 is mounted to the facing head 36 by a quick-connect mount 46 attached to the facing head 36. By virtue of the mount 46, the scanning tool 44 can be fixed easily to the facing head 36 and can also be removed easily from the facing head 36 when not required or when maintenance is necessary. Also, the scanning tool 44 can be interchanged between different facing heads 36 or indeed between different pipe facing machines if desired. In this respect, the proposed scanning tool 44 is designed to be fitted to various models of pipe facing machines.

The enlarged detail view of FIG. 2 shows that, in this example, the scanning tool 44 and the mount 46 have complementary sliding formations that are oriented to enable radial movement of the scanning tool 44 relative to the mount 46 and hence relative to the facing head 36 and the shaft 26. In this example, the sliding formations comprise female formations on the mount 46 in the form of parallel straight grooves 48, engaged with complementary male formations on the scanning tool 44 in the form of parallel straight ridges 50.

Only one groove 48 and one ridge 50 can be seen in FIG. 2, the other groove 48 and ridge 50 being hidden on the far side of the scanning tool 44. Of course, in a variant of the illustrated arrangement, the male and female formations could be reversed as between the scanning tool 44 and the mount 46.

The scanning tool 44 comprises a distally-tapered body 52 that supports a tracking roller 54 at its distal end. The tracking roller 54 protrudes distally from the body 52 and turns about an axis of rotation 56 that is parallel to the central longitudinal axis 28.

The tapered body 52 of the scanning tool 44 has an inclined upper surface that supports a scanner 58. When the pipe facing machine 10 fitted with the scanning tool 44 is in use as shown in FIGS. 3 and 4, the scanner 58 lies proximally of the bevel 42 and radially outwardly of the inner surface of the pipe joint 12 with respect to the central longitudinal axis 28.

The scanner 58 of the scanning tool 44 is positioned radially outwardly of the axis of rotation 56 of the tracking roller 54 with respect to the central longitudinal axis 28. The scanner 58 is also positioned proximally with respect to the tracking roller 54.

A scanning face 60 on the distal side of the scanner 58 is inclined to face distally and radially inwardly so as to face the bevel 42 at the end 20 of the pipe joint 12 when the scanning tool 44 is in use as shown in FIGS. 3 and 4. When the scanning tool 44 is in that position, the tracking roller 54 bears against the inner surface of the pipe joint 12 so as to rotate as the scanning tool 44 turns with the facing head 36 with respect to the pipe joint 12. This is best appreciated in the enlarged detail view of FIG. 4.

Rotation of the tracking roller 54 is sensed to determine the position of the scanning tool 44 with respect to the pipe joint 12 as the facing head 36 turns. In this way, the tracking roller 54 serves as an encoding wheel for the scanning system.

Returning to FIG. 2, this shows a radiation source 62 on the scanning face 60 of the scanner 58, such as a laser. When the scanning tool 44 is in use as shown in FIGS. 3 and 4, the radiation source 62 emits a scanning beam 64 of electromagnetic radiation such as laser light toward the bevel 42.

FIG. 2 also shows a sensor 66 on the scanning face 60 of the scanner 58, which receives radiation of the scanning beam 64 reflected from the bevel 42. The sensor 66 may, for example, be of the CCD or CMOS type to capture images of the bevel 42 digitally. The signal produced in the sensor 66 by the reflected radiation represents the shape and dimensions of the bevel 42, including the underlying shape of the pipe joint 12 itself.

The signal produced by the reflected radiation is processed with regard to the position of the scanning tool 44 with respect to the pipe joint 12, as determined by rotation of the tracking roller 54. Processing may take place in the scanning tool 44 or elsewhere, for example in a separate processor 68 shown in FIG. 3, to generate data representing the shape and dimensions of the bevel 42. That data is recorded for analysis and may also be displayed to an operator in real time.

The scanning tool 44 and the processor 68 suitably have a facility for wireless data transfer, represented here schematically by respective aerials 70. This avoids the need for wired data transfer, which would be impractical as the scanning tool 44 must turn with the facing head 36.

A data store 72 records data received from the scanning tool 44. This allows the operator to record measurements of the pipe end 20 and to monitor the evolution of those measurements over time to detect trends that require correction, for example due to wear of the facing tools 38 or other components of the pipe facing machine 10. Alternatively, a data store could instead be integrated with the scanning tool 44.

The processor 68 may also process data received from the scanning tool 44 and/or held in the data store 72. Once processed, data from the processor 68 may be used to drive a suitable display. Also, outputs from the processor 68 may be used to control the pipe facing machine 10, causing it to modify the bevel 42 to correct any dimensional errors or other flaws as they are detected by the scanner 58.

Real-time control of the pipe facing machine 10 while cutting a bevel 42 is just one of various possible modes of operation of the scanning tool 44. In other modes of operation, scanning and bevelling operations could be separated by using the scanning tool 44 mounted on the rotating facing head 36 to scan the end 20 of the pipe joint 12 even when the facing tools 38 are not cutting the end 20 of the pipe joint 12.

In one example, the scanning tool 44 could be used to scan the end 20 of the pipe joint 12 in a circumferential scanning pass before the bevel 42 is cut or a pre-formed bevel 42 is skimmed or otherwise finished. The facing head 36 is then advanced to engage the facing tools 38 with the end 20 of the pipe joint 12. This has the advantage of not needing to rig a separate bevel measuring device to scan the end 20 of the pipe joint 12 before rigging the pipe facing machine 10.

In another example, the scanning tool 44 could be used to scan the end 20 of the pipe joint 12 in a circumferential scanning pass after the bevel 42 is cut, skimmed or otherwise finished. In this case, scanning takes place after the facing head 36 has been retracted proximally to disengage the facing tools 38 from the end 20 of the pipe joint 12. The pipe facing machine 10 remains in situ. This has the advantage of not needing to rig a separate bevel measuring device to scan the end 20 of the pipe joint 12 after rigging and then de-rigging the pipe facing machine 10. This has the further advantage that if any flaws in the bevel 42 are detected in the scanning pass, the facing head 36 can simply be advanced distally to re-engage the facing tools 38 with the end 20 of the pipe joint 12 to cut a fresh bevel 42. There is no need to rig and then de-rig a bevel measuring device in the meantime.

Some other possible variations are not shown in the drawings. For example, a bias means such as a compression spring can act between the mount 46 and the scanning tool 44 to bias the scanning tool 44 radially outwardly. The bias force presses the tracking roller 54 against the inner surface of the pipe joint 12 to ensure reliable tracking of the position of the scanning tool 44 with respect to the pipe joint 12 as the facing head 36 turns. Also, a linear sensor may be provided to measure the internal radius of the pipe joint 12. Such a sensor could conveniently be carried by a suitably-adapted scanning tool 44. Measurements of internal radius can be used to optimise the alignment of pipe ends before welding.

In another variation, the tracking roller 54 could be omitted, in which case the position of the scanning tool 44 relative to the pipe joint 12 may be tracked in other ways. For example, relative movement between the scanning tool 44 and the end 20 of the pipe joint 12 could be measured by scanning. In this respect, it is possible for scanning to determine the speed at which features of the end 20 of the pipe joint 12 pass the scanner 58. Alternatively, it would be possible to generate an inclination signal using a positional sensor such as an accelerometer in the scanning tool 44 or otherwise mounted on the facing head 36. Variations in the inclination signal can be measured and processed to determine the angle and speed of rotation of the facing head 36.

The invention has been described above in the context of bevelling an end of a pipe joint before automatic welding, as experienced in the subsea oil and gas industry. The invention arises from problems encountered in the subsea oil and gas industry and has special benefits when used in that industry to fabricate pipelines from pipe joints. However, in its broadest sense, the inventive concept could also be applied when bevelling a non-circular or non-circumferential edge, such as a straight edge of a steel plate.

The invention claimed is:

1. A method of facing an edge of a workpiece to prepare that edge for welding, the method comprising scanning the edge with at least one scanning tool mounted on a moving head of an edge-facing machine while that moving head is moved along said edge, and cutting or grinding the edge using an edge-facing tool of the edge-facing machine to face said edge.

2. The method of claim 1, wherein at least one edge-facing tool is also mounted on said moving head of the edge-facing machine.

3. The method of claim 1, comprising:
fixing the edge-facing machine in a facing-ready position relative to the workpiece; and
while the edge-facing machine is in the facing-ready position, moving the or each scanning tool along said edge of the workpiece to measure said edge.

4. The method of claim 3, comprising, after measuring said edge end while the edge-facing machine remains in the facing-ready position:

advancing the or each edge-facing tool of the edge-facing machine into engagement with said edge; and moving the or each edge-facing tool along said edge to face said edge.

5. The method of claim 3, comprising, before measuring said edge and while the edge-facing machine is in the facing-ready position;

advancing the or each edge-facing tool of the edge-facing machine into engagement with said edge; and moving the or each edge-facing tool along said edge to face said edge.

6. The method of claim 5, further comprising retracting the or each edge-facing tool of the edge-facing machine out of engagement with said edge before measuring said edge.

7. The method of claim 5, comprising measuring said edge while moving the or each edge-facing tool along said edge to face said edge.

8. The method of claim 4, comprising controlling facing of said edge in accordance with measurements of said edge taken by the or each scanning tool.

9. The method of claim 3, further comprising moving the or each scanning tool along said edge of the workpiece to measure said edge, after facing said edge and while the edge-facing machine remains in the facing-ready position.

10. The method of claim 1, comprising wirelessly communicating edge measurement data from the or each scanning tool to a data store.

11. The method of claim 1, comprising tracking the position of the or each scanning tool relative to said edge of the workpiece during scanning.

12. The method of claim 11, wherein the or each scanning tool is biased into tracking contact with the workpiece.

13. The method of claim 1, performed on a circumferential edge of a tubular workpiece and comprising moving the or each scanning tool circumferentially relative to the tubular workpiece on a rotary moving head of the machine.

14. The method of claim 1, comprising scanning the edge with the at least one scanning tool before, while or after an edge-facing tool of the edge-facing machine cuts or grinds the edge.

15. An edge-facing machine comprising at least one edge-facing tool configured to cut or grind an edge of a workpiece to face said edge, and further comprising at least one scanning tool mounted on a movable head of the machine, which head is movable relative to a support frame of the edge-facing machine along the edge of the workpiece, wherein at least one edge-facing tool is mounted on the movable head adjacent to the or each scanning tool;

the or each scanning tool and the or each edge-facing tool are positioned on a distal side of the movable head;

and the or each scanning tool is oriented to emit an edge-scanning beam distally.

16. The machine of claim 15, wherein the or each scanning tool is positioned between two or more edge-facing tools on the movable head.

17. The machine of claim 15, further comprising a wireless data link for transmitting edge measurement data from the or each scanning tool for storage or processing.

18. The machine of claim 15, wherein the or each scanning tool comprises an encoding wheel positioned to engage the workpiece during scanning to track the position of said scanning tool relative to said edge of the workpiece during scanning.

19. The machine of claim 15, comprising a movable or removable mounting for the or each scanning tool on the movable head.

20. The machine of claim 15, wherein the movable head is a rotary head arranged to turn about an axis of rotation.

21. The machine of claim 20, further comprising a mounting head that is cooperable with a tubular workpiece to anchor the machine relative to the workpiece by radial movement of at least one clamping element relative to the axis of rotation of the rotary head.

* * * * *